United States Patent [19]

Knapp et al.

[11] Patent Number: 5,685,938
[45] Date of Patent: Nov. 11, 1997

[54] PROCESS FOR ENCAPSULATING GLASS FIBER INSULATION

[75] Inventors: Kenneth D. Knapp, Norristown, Pa.; Christopher R. Donnelly, Madera, Calif.; Hal J. Robbins, Langhorne, Pa.

[73] Assignee: CertainTeed Corporation, Valley Forge, Pa.

[21] Appl. No.: 522,127

[22] Filed: Aug. 31, 1995

[51] Int. Cl.⁶ ........................................ B32B 3/04
[52] U.S. Cl. .............. 156/213; 156/212; 156/216; 156/285; 156/324
[58] Field of Search ................ 156/40, 204, 212, 156/213, 214, 216, 227, 285, 324, 444, 463, 62.2; 52/404.1, 406.1, 406.2, 406.3; 53/511, 526

[56] References Cited

U.S. PATENT DOCUMENTS

| | | |
|---|---|---|
| 2,913,104 | 11/1959 | Parker . |
| 3,398,811 | 8/1968 | Muller ..................... 156/216 |
| 3,546,846 | 12/1970 | Sens . |
| 5,098,498 | 3/1992 | Hale et al. . |
| 5,169,700 | 12/1992 | Meier et al. . |
| 5,240,527 | 8/1993 | Lostak et al. . |
| 5,246,514 | 9/1993 | Alderman et al. ..................... 156/285 |
| 5,318,644 | 6/1994 | McBride et al. . |
| 5,362,539 | 11/1994 | Hall et al. . |
| 5,400,569 | 3/1995 | Jones et al. . |

FOREIGN PATENT DOCUMENTS 59-30544  7/1984  Japan .

OTHER PUBLICATIONS

Dictionary of Scientific and Technical Terms, Third Edition, McGraw-Hill, 1984, p. 1025.
Derwent Abstract, WPI Acc. No. 81-145330/09.

Primary Examiner—Richard Crispino
Attorney, Agent, or Firm—Paul and Paul

[57] ABSTRACT

Encapsulated glass fiber insulation is made by forming a covering material over the top surface of a mineral fiber core, with the formed covering material extending adjacent the side surfaces. The covering material is greater in width than the sum of the widths of the top and two side surfaces, so that the edges of the formed covering material extend beyond the mineral fiber core. A vacuum is applied below the mineral fiber core to draw the formed covering material extending beyond the side surfaces under the core.

8 Claims, 5 Drawing Sheets

PROCESS FOR ENCAPSULATING GLASS FIBER INSULATION

BACKGROUND OF THE INVENTION

1. Field of the Invention

The present invention relates to a process for making building insulation of the type including a blanket of mineral fibers and a facing sheet adhered to the top of the blanket to form an insulation assembly.

2. Brief Description of the Prior Art

Insulation blankets formed from mineral fibers, very often glass fiber, are well known and have long been used for building insulation. The thickness of the mineral fiber blanket is generally proportional to the insulative effectiveness or "R-value" of the insulation, although other factors also affect the R-value of insulation of a specific thickness. A facing sheet, typically formed from Kraft paper, is often adhered to the mineral fiber blanket with a bituminous material, thus providing a vapor retarder. The facing sheet typically has edges which, when in an extended position, project beyond the sides of the mineral fiber blanket for the purpose of securing the insulation in between wall studs, floor joists, roof rafters, and the like. The blanket is typically formed from glass fibers, often bound together using a resinous material. The insulation is typically compressed after manufacture and packaged, so as to minimize the volume of the product during storage and shipping, and to make handling and installing the insulation easier. After the packaging is removed the insulation tends to quickly "fluff up" to its prescribed label thickness for installation.

Such insulation typically has exposed mineral fiber surfaces on two sides, two ends and on one or both of the major surfaces of the blanket. The exposed surfaces permit air to be easily removed from the insulation during compression prior to packaging, and also permit air to quickly reenter the product after the packaging is removed at the installation site. However, the exposed surfaces can make installation troublesome, as contact may irritate exposed flesh, and some release of unbound fibers and dust into the working environment may occur.

In some cases, "encapsulated" insulation assemblies have been manufactured. Encapsulated insulation assemblies have the top sides, and in the bottom of such insulation assemblies covered with a material to reduce contact with the glass fiber. In manufacturing such insulation assemblies, the encapsulating material, which may be a sheet of plastic or the like, is draped over the mineral fiber blanket. The edges of the encapsulating material can be mechanically "tucked" under the mineral fiber blanket using forming "shoes" and bars which tuck and fold the material. It is believed that tucking the edges of the encapsulating material under the mineral fiber blanket tends to result in tearing of the encapsulating material, associated with a concomitant reduction in production and time and increase in manufacturing costs. The process of the present invention addresses the problems associated with mechanically tucking the edges of the encapsulating material under the mineral fiber blanket.

SUMMARY OF THE INVENTION

The present invention provides a process for manufacturing an insulation assembly further comprising a web of encapsulating material, such as a non-woven covering, extending over the side surfaces and one of the major surfaces of a mineral fiber blanket, the covering being attached to a first major surface and at least one of the side surfaces. Preferably, the covering extends at least partially over the second major surface, and is adhered to the web using adhesive.

The present process for encapsulating glass fiber insulation comprises providing a longitudinally extending mineral fiber core having opposed major, top and bottom surfaces, opposed side surfaces and opposed end surfaces, and forming or draping a covering material over the top surface. The formed covering material extends adjacent the side surfaces. Further, the covering material is greater in width than the sum of the widths of the top and two side surfaces, such that the edges of the formed covering material extend below the side surfaces. The process further comprises providing a vacuum which draws the covering material under the core and adjacent the bottom major surface. Preferably, the process further comprises providing a facing adjacent the bottom major surface; and adhering the facing to the bottom major surface. In a presently preferred embodiment, a continuous web of the covering material is formed over a continuous moving glass fiber core using a web former. Preferably, the covering material formed over the top and side surfaces is pulled by a vacuum towards the core to conform to the shape of the core. Depending on the type of covering and facing materials used, they can be secured to the glass fiber core using adhesive, or if they are formed from a suitable thermoplastic or include a suitable thermoplastic layer, heat can be applied to soften the facing material or layer to adhere it to a respective surface of the glass fiber core. The mineral fiber blanket employed can be any conventional thickness or width, and the product can be formed into batts, rolls, sheets, etc.

DETAILED DESCRIPTION

The insulation assemblies prepared by the process of the present invention can be manufactured using conventional mineral fiber blankets or mats, for example, glass fiber mats produced from fibers formed from a glass melt, and treated with a binder such as phenol-formaldehyde resole resin-based binder. Insulation assemblies intended for thermally insulating buildings typically have a low glass fiber density, such as from about 0.3 to 1.5 pounds per cubic foot ($4.8 \times 10^{-3}$ g/cm$^3$ to $2.4 \times 10^{-2}$ g/cm$^3$). An often used Kraft paper facing can be coated on one side with a hydrophobic, thermoplastic material, such as a bitumen. The facing can optionally be a polyethylene coated Kraft or other suitable facing. The coating is preferably applied in sufficient amount so as to provide an effective barrier (or retarder for preferably most) water vapor, for example, so as to reduce the water vapor permeability of the coated Kraft paper to no more than about one perm. The thermoplastic coating material preferably has a melt or softening temperature sufficiently higher than the temperatures which the insulation product will encounter when installed, so that the coating does not soften, become sticky, or permit the facing to slip or become detached from the mineral fiber blanket after manufacture and during transportation, storage or use. On the other hand, the melt temperature is preferably sufficiently low so that the coating on a moving web of the coated Kraft paper can be easily and economically softened by conventional means during manufacture of insulation assemblies.

Figure 1:
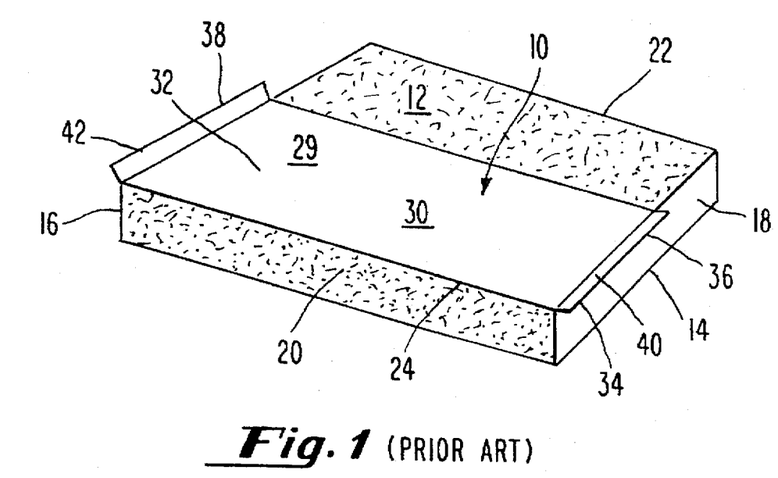
FIG. 1 is a perspective view of an unencapsulated insulation assembly of the prior art, shown in an inverted position.

Referring now to the drawings, in which like reference numerals identify like elements throughout the several views, there is shown in FIG. 1 a perspective view of section of an unencapusulated insulation assembly 10 of the prior art shown for comparison purposes. The section is shown inverted from the orientation in which it is manufactured for illustration purposes, so that the physical bottom of the assembly (during manufacture) is shown facing up, etc. The insulation assembly 10 includes a low density glass fiber blanket or mat 20 formed from glass fibers treated with a phenolformaldehyde resole resin-based binder, and having a lower major surface or bottom 12, an opposed generally parallel upper major surface or top 14, a pair of opposed generally parallel side surfaces 16, 18, and a pair of opposed, generally parallel end surfaces 22, 24, the glass fibers being generally oriented from one end surface 22 to the other end surface 24 and parallel the side surfaces 16, 18 and major surfaces 12, 14. The insulation assembly 10 also includes a bottom facing 30 extending over the entire bottom 12 of the glass fiber blanket 20 (shown cut away in FIG. 1 to reveal a portion of the bottom 12 of the glass fiber blanket 20). The bottom facing 30 is formed from Kraft paper and includes a central portion 29 coextensive with the bottom 12 of the glass fiber mat 20 and a pair of tabs 40, 42 proximate the facing edges 36, 38. The tabs 40, 42 are normally folded inward and over the central portion 29 of the bottom facing 30 (not shown), but shown here projecting beyond the side surfaces 16, 18 of the glass fiber blanket 20, in position for securing the insulation assembly in between wall studs, roof rafters, floor joists, and the like, when the insulation assembly 10 is installed.

Figure 2:
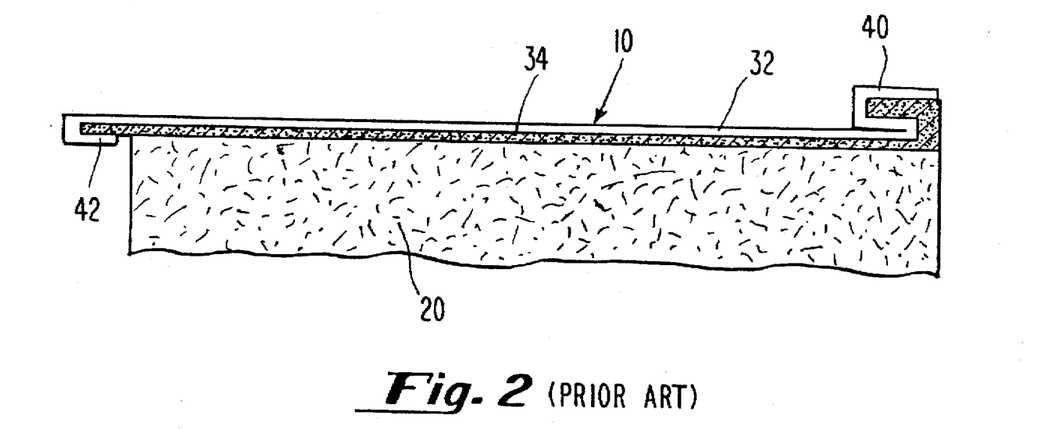
FIG. 2 is an elevational view of the insulation assembly of FIG. 1 as viewed from one end.

The bottom facing 30 includes a Kraft paper sheet 32, and the Kraft paper sheet 32 is coated on one side with a layer of bituminous material 34, as is better seen in the end elevational view of FIG. 2. The bituminous coating layer 34 serves to adhere the bottom facing 30 to the bottom or lower major surface 12 of the glass fiber blanket, and also serves a water vapor barrier or retarder when the insulation assembly 10 has been installed. It also serves to provide a means to fold the facing in the tab area for a double thickness. The bottom facing 30 can be heated to soften the bitumen just prior to applying, or when applying, the bottom facing 30 to the bottom 12 of the glass fiber blanket 20, so that the glass fibers become imbedded in the softened bituminous layer 34. The bituminous layer 34 secures the bottom facing 30 to the glass fiber blanket 20 when the bitumen has cooled.

Figure 3:
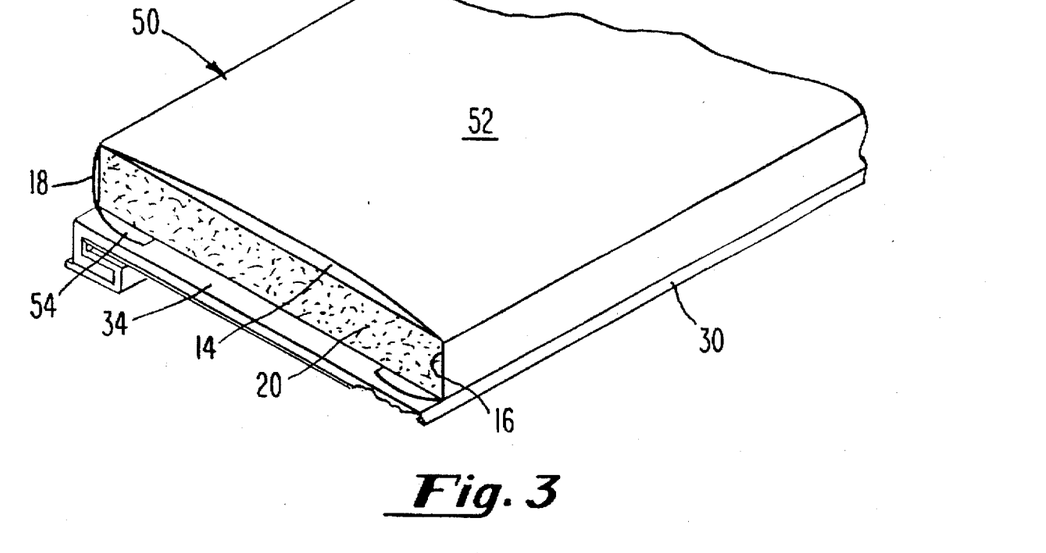
FIG. 3 is a perspective view of an encapsulated insulation assembly prepared using the process of the present invention showing the left tab, with the right (fragmentally omitted) being a mirror image of the left tab.
Figure 4:
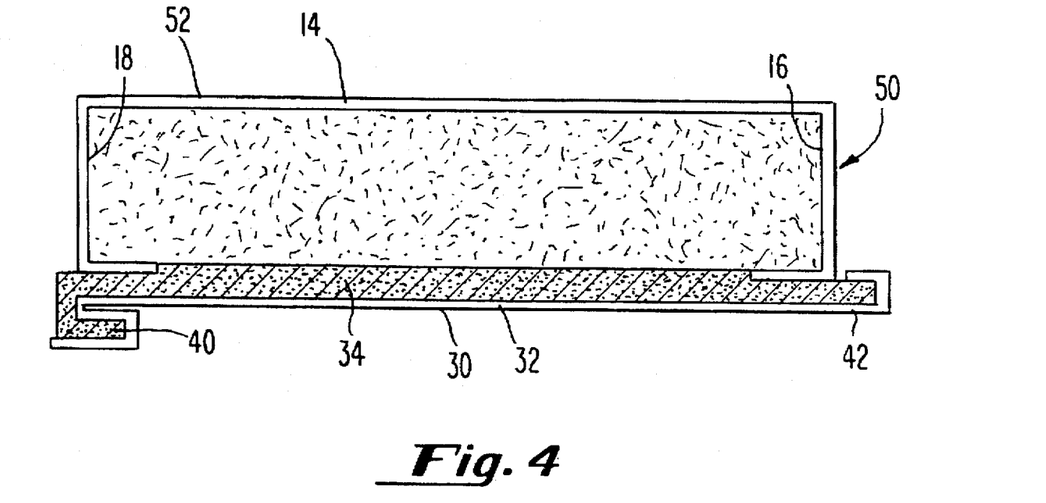
FIG. 4 is an elevational view of the insulation assembly of FIG. 3 as viewed from one end, but with the left tab folded as in manufacturing and the right tab extended as both tabs would be for installation.

The process of the present invention provides, in contrast, encapsulated glass fiber assemblies, for example such as shown in the perspective view of FIG. 3 and the end elevational view of FIG. 4. The encapsulated insulation assembly 50 includes an upper or top facing or covering 52 which encases the sides 16, 18 and top 14 of the glass fiber blanket 20, with the side edges 54 of the top facing 52 being formed in between the bottom facing 30 and the glass fiber blanket 20 proximate the sides 16, 18 of the glass fiber blanket. The covering 50 is preferably formed from a web of non-woven material. Non-woven materials are sheets of randomly oriented natural or synthetic fibers, such as polyolefins, polyester or rayon, sometimes secured together by a binder, typically based on a polymeric material, such as an acrylic resin, a vinyl-acrylic resin, or the like. The non-woven material may be, for example, spun-bonded polyester or polyolefin, or a thermally bonded polypropylene. The non-woven covering 50 is secured to at least a portion of the glass fiber mat, preferably using an adhesive material, such as a hot melt adhesive material, which can be applied to the web of covering 50 or to portions of the insulation sides 16, 18 and the top 14, just before the covering 50 is applied to the glass fiber blanket 20.

Alternatively, the covering 40 may be formed from an integral plastic sheet material or film, such as polyethylene. The integral plastic film can be metalized, such as an aluminized polyethylene film or the like. If a integral plastic film is employed as covering 40, it is preferred that the film be perforated, such as by slits or holes, either during manufacture of the film or during production of the insulation assembly 10, so that air can easily enter and leave the glass fiber mat 20 when the insulation assembly 10 is compressed for packaging prior to shipment and correspondingly "fluffed up" when the packaging is removed and the insulation assembly 10 is unrolled and cut to size during installation on-site. Perforations in the film also allow for the necessary transmission of moisture when no vapor retarder properties are desired.

As seen in both FIG. 2 and FIG. 4, the edges 36, 38 of the bottom facing 30 are usually folded over themselves during manufacture to provide side tabs 40, 42 of increased thickness and strength and suitable for stapling or nailing the insulation assembly 10 in place to wall studs, roof rafters or floor joists during installation. During manufacture such tabs are usually folded over to overlie the bottom facing 30, such as the left-hand tab 40 shown in FIG. 4, the tabs 40, 42 of the bottom facing 30 can be easily folded, If desired for installation purposes, such tabs can later be unfolded, such as the right-hand tab 42 shown in FIG. 4, to permit mechanically affixing the insulation assembly in place.

Figure 5:
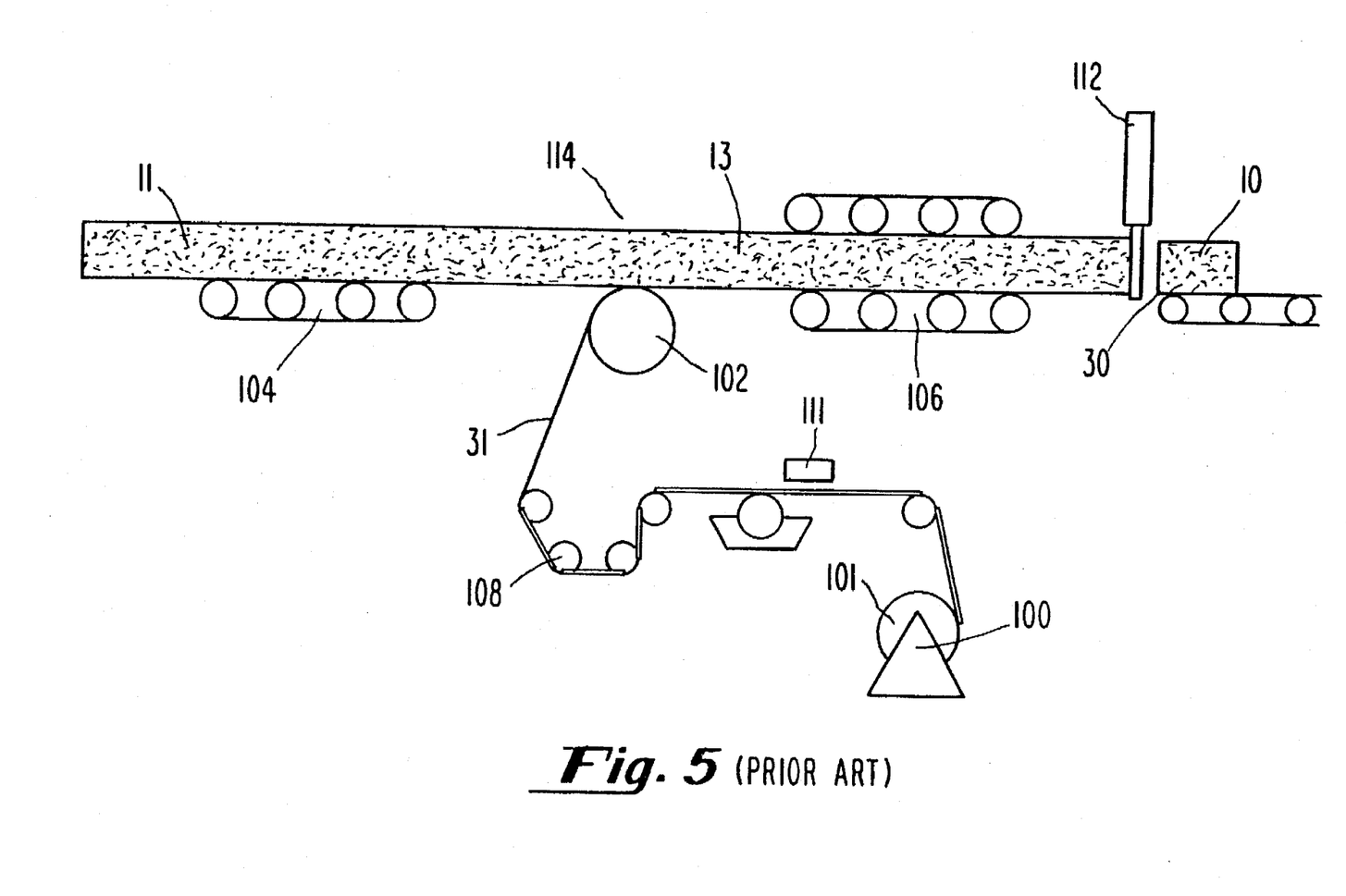
FIG. 5 is a schematic side elevational view of a prior art process for producing the insulation assembly of FIG. 1.

A prior art process for producing the insulation assembly 10 is shown schematically in FIG. 5. A continuous glass fiber blanket or mat 11 formed in a conventional manner is presented by a feed conveyer 104 to a heated roll 102, to which is simultaneously supplied a continuous web of bitumen-coated Kraft paper 31, fed between the heated roll 102 and the glass fiber mat 11. The web of Kraft paper is bitumen-coated via roller 120 of FIG. 6 after being supplied from a roll 101 on a pay-out stand 100, through an accumulator 108 for tensioning the web 31. In addition, the outside surface of the web can be marked at a marking station 111 with identifying information such as the R-value of the glass fiber mat and the production lot code before the web 31 is applied to the bottom of the glass fiber mat 11. Preferably, the edges of the web are folded over to form the tabs 40, 42 (FIG. 1) just prior to the web contacting the heated roll 102. The web 31 is oriented so that the bitumen-coated side of the web 31 faces the bottom of the glass fiber mat 11. The temperature is preferably selected to provide enough heat to soften the bituminous coating such that the bitumin-coated Kraft paper adheres to the underside of the glass fiber mat 11, thus forming a faced glass fiber mat 13. The faced glass fiber mat 13 is transported away from the heated roll 102 by a tractor section 106, and delivered to a chopper 112, which periodically chops the faced glass fiber mat 13 to form insulation assemblies 10. The insulation assemblies 10 so formed are transported to packaging equipment (not shown).

Figure 6:
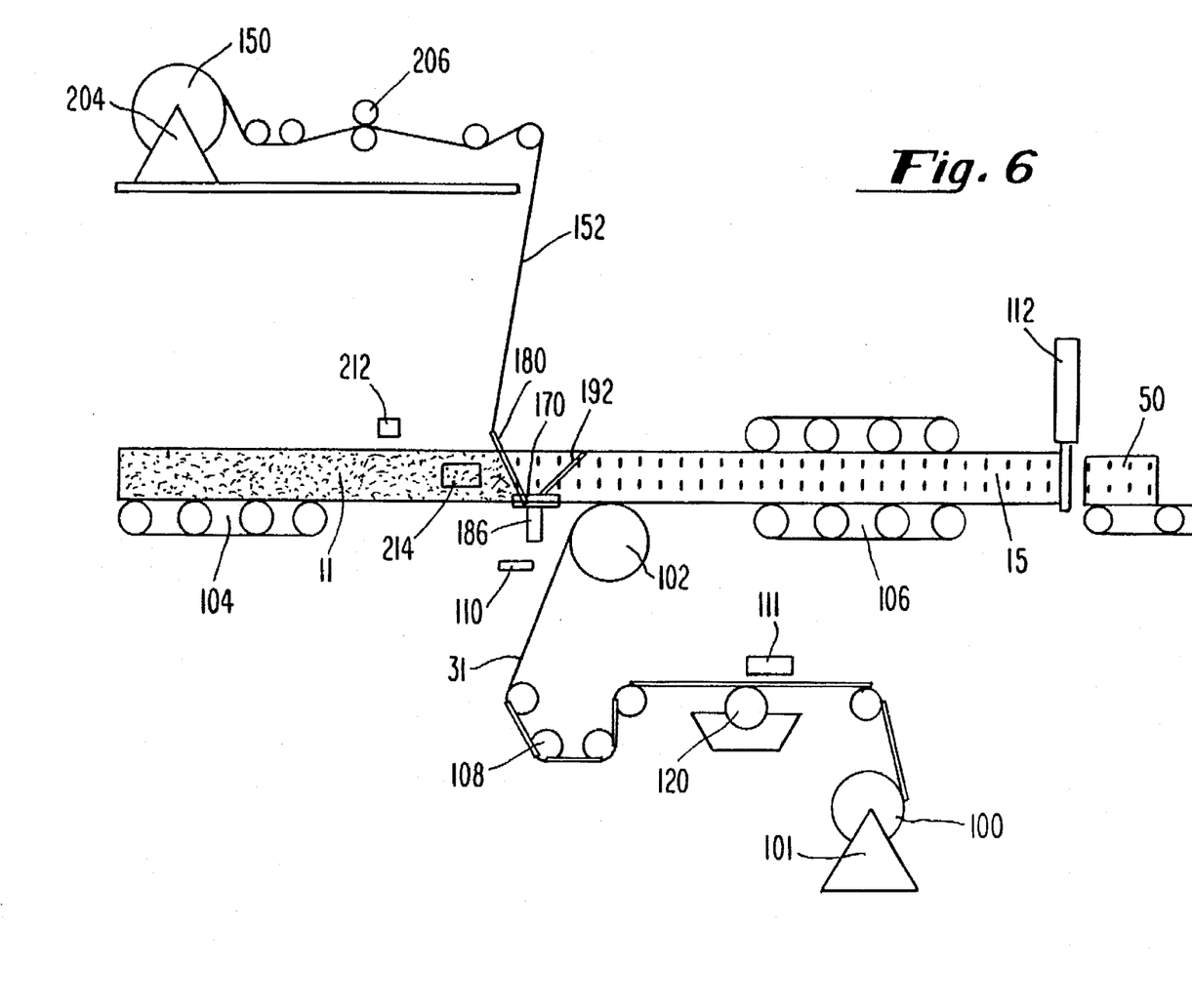
FIG. 6 is a schematic side elevational view of a process according to the present invention for producing the insulation assembly of FIG. 3.

The process of the present invention for producing an encapsulated insulation assembly 50 such as shown in FIG. 3 is shown schematically in FIG. 6. A continuous glass fiber mat 11 formed in a conventional manner and transported by a series of conveyers (not shown) to a web former 170, through which it passes. In a present preferred embodiment, the top and sides of the glass fiber mat 11 are preferably sprayed with a hot melt or other suitable adhesive just before the glass fiber mat 11 passes through the web former 170 applied by a series of glue applicators or spray nozzles 212, 214. The top glue applicators 212 preferably provide adhesive in a spray pattern, while the side applicators 214 preferably provide adhesive in a swirl or other pattern. The amount of adhesive and pattern in which the adhesive is applied are preferably selected to minimize peel back of the encapsulation web from the glass fiber mat during chopping and cutting in the field during installation. Simultaneously, a web of encapsulation material 152 is supplied to the web former 170. Optionally, adhesive can be applied to the web of encapsulation material 152 instead of or in addition to the adhesive applied to the glass fiber mat 11. The web of encapsulation material 152 is drawn from a roll of encapsulation material 150 mounted on a payout stand 204 positioned on a platform above the glass fiber mat 11. When the encapsulation material 152 is non-porous, then a perforator 206 can optionally be employed to periodically perforate the web of encapsulation material 152 for the purpose described below.

The web of encapsulation material 152 has a width sufficient to extend completely around the upper major face, side surfaces, and partially beneath the lower major face of the glass fiber mat 11. At the web former 170, the web of encapsulation material 152 is formed over the top and sides of the glass fiber mat 11. The web of encapsulation material 152 extends beyond the glass fiber mat 11 on either side, and is sucked under the glass fiber mat 11 by application of vacuum to the web former 170. The vacuum also tends to conform the web 152 to the glass fiber mat 11, thus minimizing loose and wrinkled material.

When encapsulation material 152 is non-porous, it has been found helpful in drawing the web around the glass fiber mat to perforate the web using the perforator 206, forming a series of holes which lie proximate the sides of the glass fiber mat when the encapsulation material is formed or draped over the mat at the web former 170. Immediately after the sides of the web of encapsulation material 152 have been drawn under the glass fiber mat 11, the glass fiber mat 11 passes over a heated roll 102, coming in contact with an adhesive-coated bottom facing 30 to provide an encapsulated glass fiber mat 15. The adhesive-coated bottom facing 30 may be or may have included a vapor retarder in accord with the desired finished product.

Preferably, a facing is applied to the bottom of the encapsulated glass fiber mat 15 such as described above, and the finished mat is then chopped into individual encapsulated insulation pieces or assemblies 50, which are then packaged for shipment.

Figures 7, 8, 9:
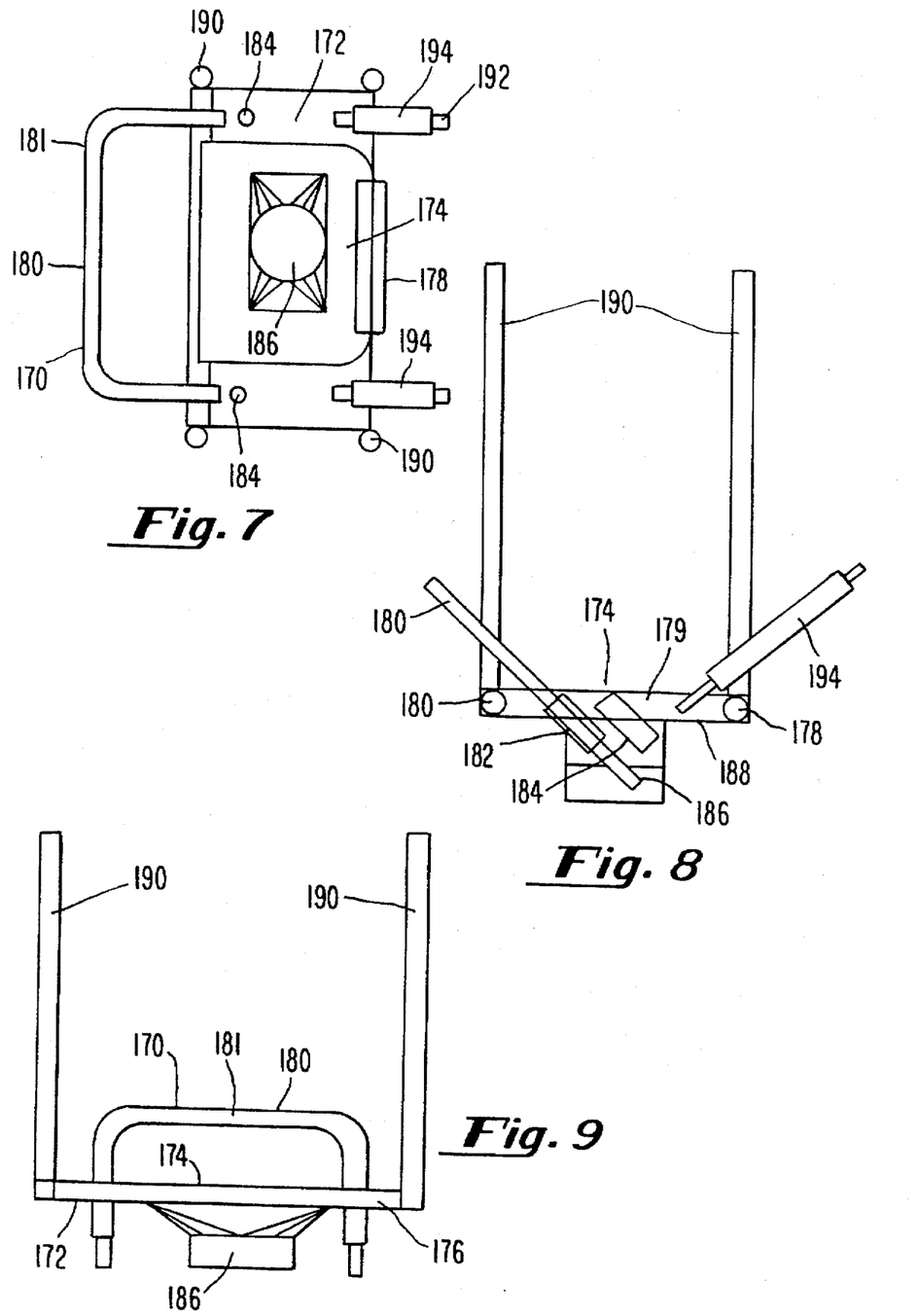
FIG. 7 is a top view of a web-forming device employed in the process of FIG. 6.
FIG. 8 is a side elevational view of the web-forming device of FIG. 7.
FIG. 9 is a front elevational view of the web-forming device of FIG. 7.

The web former 170 is better seen in the top view of FIG. 7, side view of FIG. 8, and the front view of FIG. 9. The web former 170 includes a base plate 172 and a parallel top plate 174 spaced from the base plate 172 by a front spacer 176 and a rear spacer 178 to form a vacuum chamber 179. A web-shaping hoop 180 extends diagonally from a pair of sleeves 182 fixed in the base plate 170 proximate the front of the web former 170 and spaced from the sides of the top plate 174. The top plate 174 has a width slightly less than that of the glass fiber mat 11, and rounded corners at the discharge end to reduce snagging and tearing of the encapsulation material. In operation, the glass fiber mat 11 pass through the hoop 180 and over the top plate 174. The hoop 180 is adjustably mounted in the sleeves 182 so that it can be suitably positioned for glass fiber mats of different thickness. An additional pair of sleeves 184 is also provided for mounting the hoop 180, to provide additional flexibility in positioning the hoop 180. A vacuum duct 186 extends downward through an opening 188 in the base plate 172. A vacuum is applied to the vacuum chamber 179 through the vacuum duct 186. The web former 170 is suspended by a set of four generally vertical hangers 190 fixed to the base plate 172 proximate the corners. The web former 170 is constructed in this case to receive a specific width of glass fiber mat, although it could be constructed to receive multiple width mats. The web former 170 optionally includes a pair of bars 192 extending upwardly and rearwardly from the rear side portions of the base plate 172, on each of which are rotationally mounted rollers 194 for pressing the web of encapsulating material 152 against the sides of the glass fiber mat 11 in the case of side adhesive application to assist in bonding.

In operation, as shown in FIG. 6 the web of encapsulating material 152 is drawn down from above the glass fiber mat 11, and under the horizontal portion 181 (see FIG. 7) of the hoop 180, and thereby formed over the top of the glass fiber mat 11 as the glass fiber mat 11 passes through the web former 170. The width of the hoop 180 is less than that of the web of encapsulating material, hence as the web is drawn through the hoop 180, the sides of the web are directed down by contact with the inside of the sides of the hoop 180, and against the sides of the glass fiber mat 11. The portions of the web of encapsulating material 152 on either side extending beyond the sides of the glass fiber mat 11 are drawn toward the vacuum chamber 179. These portions of the web of encapsulating material 152 are subsequently pressed up against the bottom of the glass fiber mat 11 by the heated roll as the encapsulated glass fiber mat 11 emerges from the discharge end of the web former 170. Preferably, a bottom facing is supplied to the bottom of the glass fiber mat 11 at the heated roll, so that the bottom facing adheres to the edges of the web of the encapsulating material which have been formed under the glass fiber mat by passage through the web former 170, as well as to the central portion of the bottom of the glass fiber mat 11.

Various modifications can be made in the details of the various embodiments of the of the present invention, all within the scope and spirit of the invention and defined by the appended claims.

We claim:

1. A process for encapsulating compressible mineral fiber insulation, the process comprising:

a) providing a longitudinally extending mineral fiber core having opposed major, top and bottom surfaces, and opposed side surfaces;

b) forming a covering material over the top surface, the formed covering material extending adjacent the width than the sum of thing material being greater in width than the sum of the widths of the top and two side surfaces, the edges of the formed covering material extending below the side surfaces;

c) providing a vacuum under the mineral fiber core to draw the formed covering material extending below the side surfaces, including the edges of the covering material, under the core and adjacent the bottom major surface.

2. A process according to claim 1 further comprising:

d) providing a facing material adjacent the bottom major surface; and e) adhering the facing material to the bottom major surface.

3. A process according to claim 1 wherein a continuous web of the covering material is formed over a continuously moving glass fiber core using a web former.

4. A process according to claim 3 wherein the top and side surfaces of the covering material are pulled by a vacuum towards the core to conform to the shape of the core.

5. The process of claim 1, wherein the vacuum is drawn from a vacuum draw means.

6. A process according to claim 1 further comprising pressing the covering material drawn adjacent the major bottom surface by the applied vacuum into contact with the bottom major surface using a heated roll.

7. A process for encapsulating compressible mineral fiber insulation, the process comprising:

a) providing a continuously moving longitudinally extending mineral fiber core having opposed major, top and bottom surfaces, and opposed side surfaces;

b) forming a continuous web of covering material over the top surface, the formed covering material extending adjacent the side surfaces, the covering material being greater in width than the sum of the widths of the top and two side surfaces, the edges of the formed covering material extending below the side surfaces, the continuous web being formed using a web former; and c) providing a vacuum under the mineral fiber core to draw the formed covering material extending below the side surfaces, including the edges of the covering material, under the core and adjacent the bottom major surface.

8. A process for encapsulating compressible mineral fiber insulation, the process comprising:

a) providing a continuous moving longitudinally extending mineral fiber core having opposed major, top and bottom surfaces, and opposed side surfaces;

b) forming a continuous web of covering material over the top surface, the formed covering material extending adjacent the side surfaces, the covering material being greater in width than the sum of the widths of the top and two side surfaces, the edges of the formed covering material extending below the side surfaces, the continuous web being formed using a web former; and c) providing a vacuum under the mineral fiber core to draw the formed covering material extending below the side surfaces, including the edges of the covering material, under the core and adjacent the bottom major surface, the top and side surfaces of the covering material being pulled by a vacuum towards the core to conform to the shape of the core.

* * * * *

UNITED STATES PATENT AND TRADEMARK OFFICE
CERTIFICATE OF CORRECTION

PATENT NO. : 5,685,938

DATED : November 11, 1997

INVENTOR(S) : Kenneth D. Knapp, Christopher R. Donnelly, and Hal J. Robbins It is certified that error appears in the above-identified patent and that said Letters Patent is hereby corrected as shown below:

Col 7, 2nd line after "the" delete "width than the sum of thing" and insert --side surfaces, the covering--

Signed and Sealed this

Thirteenth Day of January, 1998

BRUCE LEHMAN

Attest:

Attesting Officer

Commissioner of Patents and Trademarks